US008922578B2

United States Patent
Hunleth

(10) Patent No.: US 8,922,578 B2
(45) Date of Patent: Dec. 30, 2014

(54) EMBEDDING ARGB DATA IN A RGB STREAM

(75) Inventor: Frank A. Hunleth, Rockville, MD (US)

(73) Assignee: Hillcrest Laboratories, Inc., Rockville, MD (US)

(*) Notice: Subject to any disclaimer, the term of this patent is extended or adjusted under 35 U.S.C. 154(b) by 117 days.

(21) Appl. No.: 13/575,464

(22) PCT Filed: Jan. 28, 2011

(86) PCT No.: PCT/US2011/022918
§ 371 (c)(1),
(2), (4) Date: Jul. 26, 2012

(87) PCT Pub. No.: WO2011/094537
PCT Pub. Date: Aug. 4, 2011

(65) Prior Publication Data
US 2012/0307151 A1    Dec. 6, 2012

Related U.S. Application Data

(60) Provisional application No. 61/299,628, filed on Jan. 29, 2010.

(51) Int. Cl.
*G09G 5/00* (2006.01)
*G09G 5/02* (2006.01)
*H04N 1/46* (2006.01)
*H04N 9/64* (2006.01)

(52) U.S. Cl.
CPC . *H04N 1/46* (2013.01); *H04N 9/641* (2013.01)
USPC .............................. 345/582; 345/591; 345/604

(58) Field of Classification Search
CPC ......... G06T 15/04; G06T 15/503; G09G 5/02
USPC ........................... 345/582, 591, 592, 600, 604
See application file for complete search history.

(56) References Cited

U.S. PATENT DOCUMENTS

| 7,307,667 | B1* | 12/2007 | Yeh et al. ...................... 348/555 |
| 2004/0109005 | A1* | 6/2004 | Witt et al. ...................... 345/611 |
| 2004/0247167 | A1* | 12/2004 | Bueno et al. ................... 382/132 |
| 2005/0041149 | A1* | 2/2005 | Chan et al. ..................... 348/553 |
| 2006/0033747 | A1 | 2/2006 | Chen et al. |
| 2007/0019975 | A1* | 1/2007 | Komiya .......................... 399/49 |
| 2007/0070092 | A1* | 3/2007 | Oh et al. ........................ 345/690 |
| 2007/0136741 | A1* | 6/2007 | Stattenfield ..................... 725/32 |
| 2007/0157070 | A1* | 7/2007 | Wenger et al. ................. 714/807 |
| 2008/0141001 | A1* | 6/2008 | Chung et al. ................... 712/216 |

FOREIGN PATENT DOCUMENTS

JP  2005-301414 A  10/2005
WO  98/25403 A2  6/1998

OTHER PUBLICATIONS

International Search Report issued on corresponding International application No. PCT/US2011/022918, date of mailing: Sep. 23, 2011.

* cited by examiner

*Primary Examiner* — Joni Richer
*Assistant Examiner* — Yi Yang
(74) *Attorney, Agent, or Firm* — Patent Portfolio Builders PLLC

(57) ABSTRACT

Methods and systems are provided for merging a plurality of video inputs resulting in a single coherent output. More specifically, in one exemplary embodiment, a device embeds alpha red green blue (ARGB) data in an RGB stream which allows for preservation of the alpha channel over the video interface link.

14 Claims, 12 Drawing Sheets

EMBEDDING ARGB DATA IN A RGB STREAM

RELATED APPLICATION

This application is related to and claims priority from, U.S. Provisional Patent Application Ser. No. 61/299,628, filed on Jan. 29, 2010, entitled "Embedding ARGB data in a RGB Stream", the disclosure of which is incorporated here by reference.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

As these technologies advance, more equipment has become available for viewing media content. For example, media content, e.g., television shows, movies and advertisements, can now be viewed on various display devices which can receive their inputs from different sources. Movies can be viewed on a television with the input being a high definition multimedia interface (HDMI) signal received from a cable box (or other source) via a high definition (HD) cable. Alternatively, movies can, in some cases, be viewed on a monitor attached to a personal computer (PC) with the signal received by the monitor being a digital visual interface (DVI) signal. Both the HDMI signal and the DVI signal can carry color data in either red green blue (RGB) format or the YCbCr format, however there is currently no simple, flexible way to integrate multiple HDMI and DVI signals and to also have flexible control over the output.

RGB is an easily understood and widely used color space for computers. RGB represents color as an additive combination of red, green, and blue. For example, an RGB signal having equal parts of these inputs generates a grayscale value, an RGB signal having equal parts red and green generates a yellow value while an RGB signal having equal parts green and blue generates a cyan value, and an RGB signal containing equal parts blue and red results in a magenta value. YCbCr is widely used in video formats and compression algorithms. It is a way of encoding RGB data. The YCbCr format was designed to facilitate color TV at a time when TV program was black & white. The Y component is the luminance (or how bright the image is), Cb and Cr are chrominance components.

Content which is displayed on televisions is, today, highly controlled by the content distributor, e.g., cable television providers, satellite television providers and the like. Accordingly, it would be desirable to merge in other video feeds to increase the flexibility of content viewed by end users.

SUMMARY

According to an exemplary embodiment a device for embedding alpha red green blue (ARGB) data in an RGB stream includes: a memory for storing instructions and one or more lookup tables; a processor for executing an application, wherein the application renders data into an ARGB texture; a graphics card which draws the ARGB texture on a screen and then processes the ARGB texture; and a first video output interface for transmitting said processed ARGB texture.

According to an exemplary embodiment a method for embedding alpha red green blue (ARGB) data in an RGB stream includes: storing instructions and one or more lookup tables; executing an application, wherein the application renders data into an ARGB texture; drawing the ARGB texture on a screen; processing the ARGB texture; and transmitting the processed ARGB texture.

According to another embodiment, a non-transitory computer-readable medium contains program instructions stored thereon which, when executed on a processor or computer, perform a method for transmitting alpha red green blue (ARGB) data over a link which employs color fields for RGB data, the method comprising: extracting alpha values from the ARGB data, color converting red, blue and green data from the ARGB data into YCbCr data, and transmitting the YCbCr data with the extracted alpha values over the link.

According to still another embodiment, a non-transitory computer-readable medium containing program instructions stored thereon which, when executed on a processor or computer, perform a method for processing received color data over a link which has color fields for RGB data comprising performing a checksum calculation on sequential sequences, if the checksums match, extracting alpha values from one of the sequential sequences, and color values from both of the sequential sequences, and blending pixels associated with the color values with pixels from another video source based on the alpha values.

BRIEF DESCRIPTION OF THE DRAWINGS

The accompanying drawings illustrate exemplary embodiments of the present invention, wherein.

DETAILED DESCRIPTION

Figure 1:
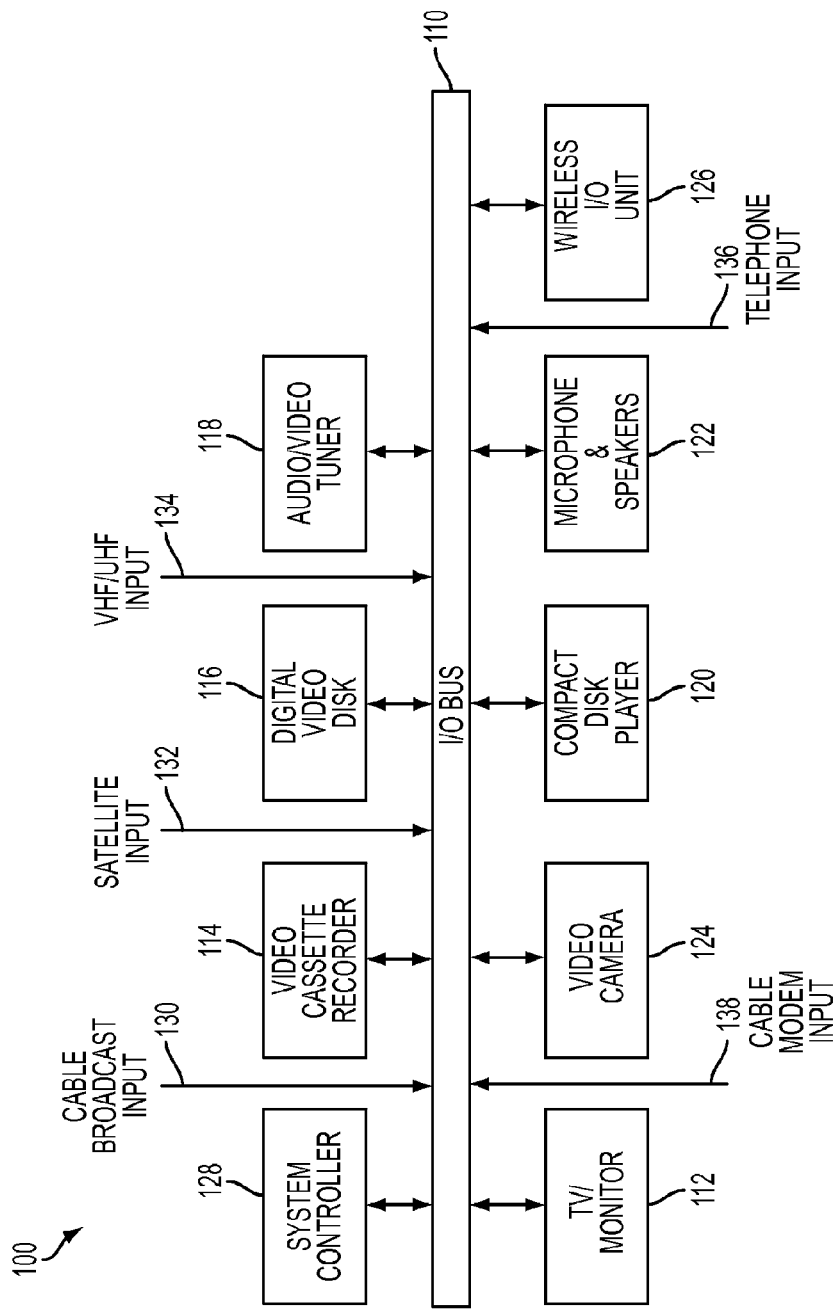
FIG. 1 depicts an exemplary media system in which exemplary embodiments of the present invention can be implemented.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 100 in which the present invention can be implemented will first be described with respect to FIG. 1. Those skilled in the art will appreciate, however, that the present invention is not restricted to implementation in this type of media system and that more or fewer components can be included therein. Therein, an input/output (I/O) bus 110 connects the system components in the media system 100 together. The I/O bus 110 represents any of a number of different mechanisms and techniques for routing signals between the media system components. For example, the I/O bus 110 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 100 includes a television/monitor 112, a video cassette recorder (VCR) 114, digital video disk (DVD) recorder/playback device 116, audio/video tuner 118 and compact disk player 120 coupled to the I/O bus 110. The VCR 114, DVD 116 and compact disk player 120 may be single disk or single cassette devices, or alternatively may be multiple disk or multiple cassette devices. They may be independent units or integrated together. In addition, the media system 100 includes a microphone/speaker system 122, video camera 124 and a wireless I/O control device 126. According to exemplary embodiments of the present invention, the wireless I/O control device 126 is a 3D pointing device. The wireless I/O control device 126 can communicate with the entertainment system 100 using, e.g., an IR or RF transmitter or transceiver. Alternatively, the I/O control device can be connected to the entertainment system 100 via a wire.

The entertainment system 100 also includes a system controller 128. According to one exemplary embodiment of the present invention, the system controller 128 operates to store and display entertainment system data available from a plurality of entertainment system data sources and to control a wide variety of features associated with each of the system components. As shown in FIG. 1, system controller 128 is coupled, either directly or indirectly, to each of the system components, as necessary, through I/O bus 110. In one exemplary embodiment, in addition to or in place of I/O bus 110, system controller 128 is configured with a wireless communication transmitter (or transceiver), which is capable of communicating with the system components via IR signals or RF signals. Regardless of the control medium, the system controller 128 is configured to control the media components of the media system 100 via a graphical user interface described below. According to one exemplary embodiment, system controller 128 can be a set-top box (STB) or a personal computer.

As further illustrated in FIG. 1, media system 100 may be configured to receive media items from various media sources and service providers. In this exemplary embodiment, media system 100 receives media input from and, optionally, sends information to, any or all of the following sources: cable broadcast 130, satellite broadcast 132 (e.g., via a satellite dish), very high frequency (VHF) or ultra high frequency (UHF) radio frequency communication of the broadcast television networks 134 (e.g., via an aerial antenna), telephone network 136 and cable modem 138 (or another source of Internet content). Those skilled in the art will appreciate that the media components and media sources illustrated and described with respect to FIG. 1 are purely exemplary and that media system 100 may include more or fewer of both. For example, other types of inputs to the system include AM/FM radio and satellite radio. Alternatively, remote devices and interaction techniques between remote devices and user interfaces in accordance with the present invention can be used in conjunction with other types of systems, for example computer systems including, e.g., a display, a processor and a memory system or with various other systems and applications.

According to exemplary embodiments, additional devices can interface with the media system 100 such as a computer and/or a mixer device which can receive and mix two or more received multimedia signals, e.g., high definition multimedia interface (HDMI) signals and digital visual interface (DVI) signals, and creating a single output. One method for mixing the two different signals, or sources, is by using a constant blend factor. However, exemplary embodiments described herein generally perform the mixing via other methods, as described below, which allow for control of portions of the source rather than the environment. For example, by installing an application on top of an operating system, e.g., Windows XP, exemplary embodiments are able to be focused on desired features associated with the sources and allow for reducing resource usage by not needing to be involved with network settings, power management, etc. However, according to an alternative exemplary embodiment, more resources can be allocated to allow for controlling these other features as well if desired.

Figure 2:
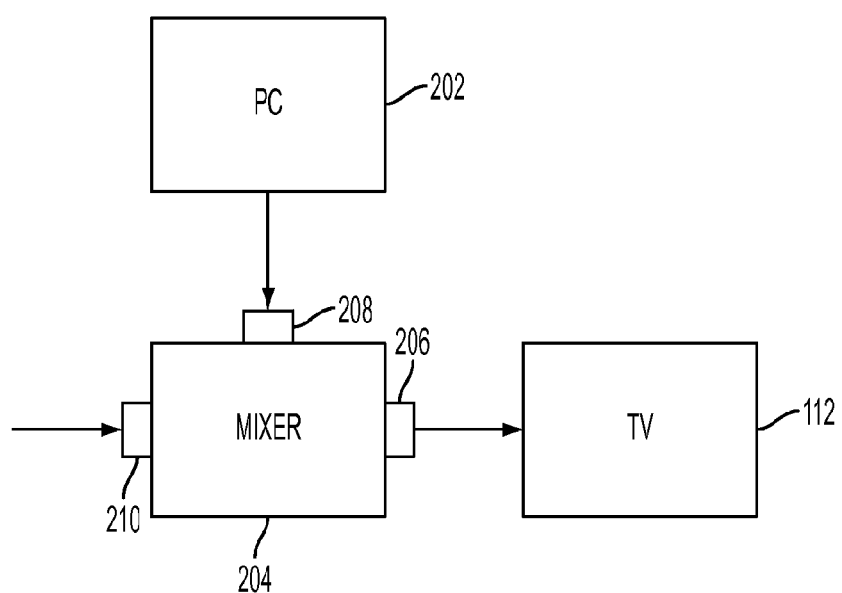
FIG. 2 shows exemplary hardware in which exemplary embodiments of the present invention can be implemented.

As described above, components can be used in association with parts of media system 100 for mixing video as shown in FIG. 2. A personal computer (PC) 202, which can include a display (not shown), can run an application which creates an output which includes video. The mixer device 204 includes multiple video inputs 208, 210 for receiving multiple video inputs of possibly different formats, e.g., HDMI, DVI or other custom video formats, as well as an HDMI output 206 for transmitting a single output signal to television (TV) 112. While shown as separate devices in FIG. 2, according to an exemplary embodiment, PC 202 and mixer 204 can be combined or implemented in a single structure. One custom format uses pixels and contains a checksum, a sub sampled 16-bit YCbCr value and 8 bits of alpha which are collectively referred to herein as Checksum, YCbCr, Alpha (CYA). Additionally, YCbCr has a higher range of colors than RGB, however since the source signal is RGB this is not an issue. Table 1 shows an exemplary layout of both formats.

TABLE 1

| | Bits | | | | | |
|---|---|---|---|---|---|---|
| | 0-7 | 8-15 | 16-24 | 24-32 | 32-39 | 40-48 |
| RGB | R1 | G1 | B1 | R2 | G2 | B2 |
| CYA | Y1 | Cb | Cr | Y2 | Alpha | Checksum |

During image processing, color data normally stores an additional field, known as the alpha channel. Alpha describes the opacity of a pixel. For example, if alpha can range from 0 to 1, a value of 0 indicates a completely transparent pixel, while a value of 1 indicates a completely opaque pixel. Using the system described above and other exemplary embodiments described herein, the alpha channel over the HDMI/DVI link can be preserved.

Throughout this specification pixels and processing pixels are described in support of the exemplary embodiments. Prior to describing those exemplary embodiments in detail, background information is provided with respect to sub-sampling which is the process of treating some number of pixels as one 'macro' pixel. In many cases, how this sampling is performed is described as a three number ratio in the form r:s:t. When described in this notation, the scheme is talking about a macro pixel that covers a region that is r pixels wide by two pixels tall. The 'r' value indicates the number of luma samples (how bright it is) while the 's' value indicates the number of chrominance samples taken from the first row and 't' is the number of chroma samples taken from the second row. For example, 4:4:4 indicates that there are four luma samples per row, and four chroma samples in each row. The 4:4:4 format can be considered the highest resolution. The 4:2:2 format indicates that there are four luma samples per row, and two chroma samples per row. This is essentially the scheme used for CYA pixels.

Currently there are no Standardized rules for how the chroma pixels are sampled. In this specification, the average of every pair of pixels is used, however it is envisioned that other variations can be used. For example, 4:1:1 indicates that there are four luma samples, per row, and one chroma sample per row. Each four consecutive pixels will share the same chroma value. For another example, 4:2:0 states there are four luma samples per row, two chroma samples in the first row, and no chroma samples in the second row. Basically, this means that a 2×2 block of pixels will all have the same chroma value. It is possible to have more combinations, but these combinations are the most common.

None of these formats actually describe how the pixels are sampled, but rather how it is compressed. Samples may be taken by any number of filtering mechanisms, such as taking a single value, or an average of the values. Additionally, these formats do not strictly state how the data is packaged. For example, HDMI supports 24-bit YCbCr 4:4:4 with 8 bits dedicated to each of the Y, Cb, and Cr components. Additionally, HDMI supports 24-bit YCbCr 4:2:2 with 12 bits dedicated to the Y component, and 5 bits for each of the Cr and Cb components.

Figure 3:
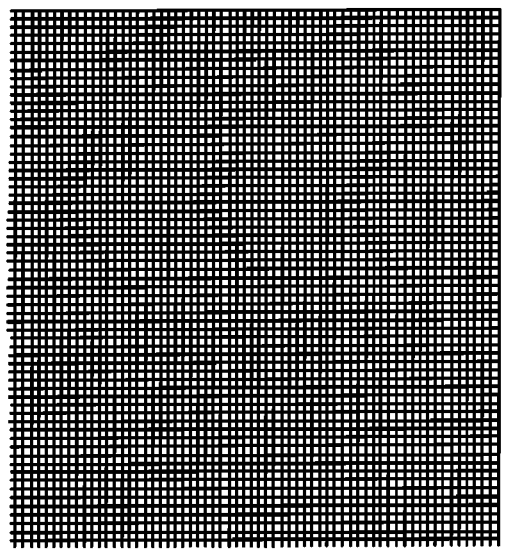
FIG. 3 illustrates an image pattern according to an exemplary embodiment of the present invention.
Figure 4:
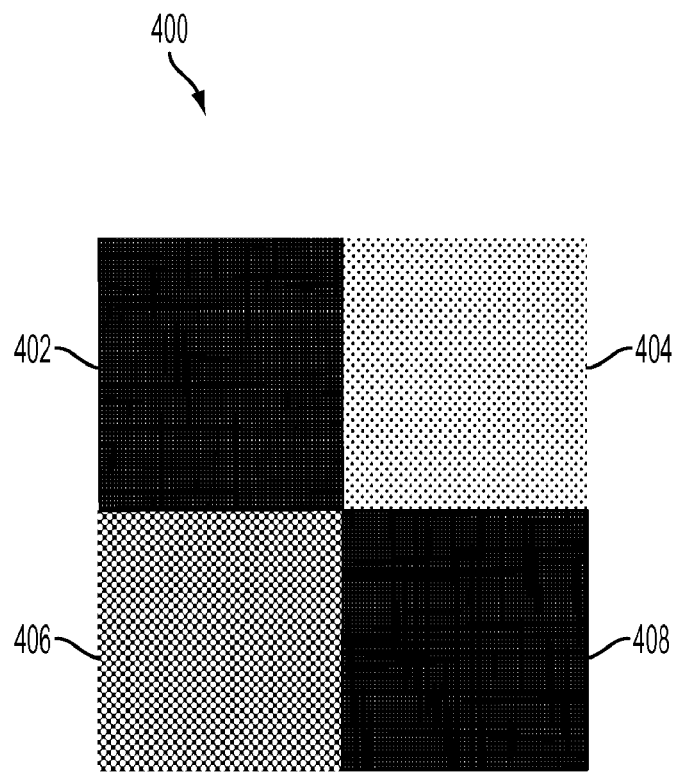
FIG. 4 shows an exploded 2×2 section of the image pattern of FIG. 3 according to an exemplary embodiment of the present invention.

Continuing on with a YCbCr 4:2:2 example, after conversion to YCbCr, pixel values are sub-sampled by the so called 4:2:2 scheme. The pixels are grouped along the x axis, and the CbCr values are super sampled on average every two pixels. For example, consider the image pattern 300 of FIG. 3 which shows an image pattern (which when viewed in color is a generally light purple color interspaced with the lighter dots). The 2 by 2 pixel region 400 in FIG. 4 is an exploded view of the image pattern 300 in FIG. 3. The pattern 400 in FIG. 4 was generated by repeating the blue 402, red 404, yellow 406 and blue 408 (when viewed in color) pattern with corresponding RGB values of (0,0,255) (blue), (255,0,0) (red), (255,255,0) (yellow).

Figure 5:
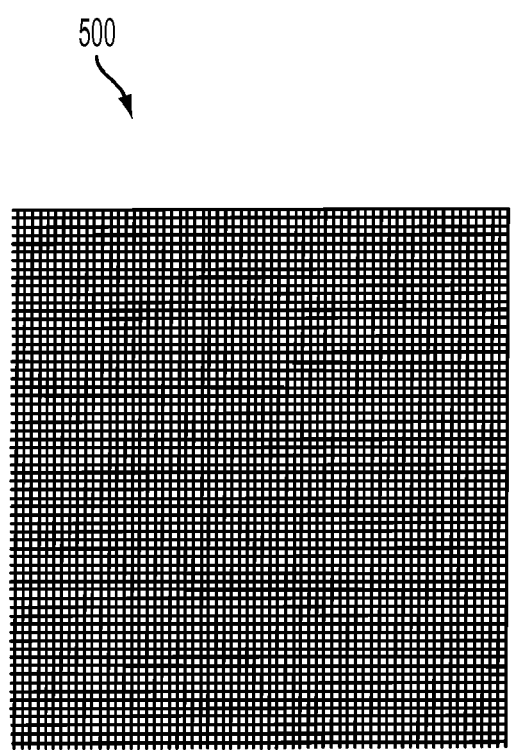
FIG. 5 illustrates the image pattern of FIG. 3 after processing according to an exemplary embodiment of the present invention.
Figure 6:
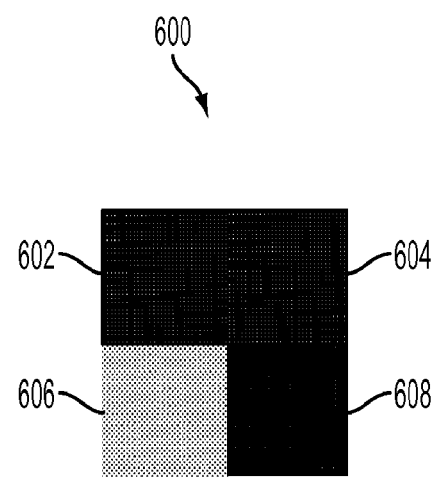
FIG. 6 shows an exploded 2×2 section of the image pattern of FIG. 5 according to an exemplary embodiment of the present invention.

According to exemplary embodiments, pixels are sampled as pairs along the x-axis, so, for this pattern, blue and red are converted to YCbCr, and then the Cb and Cr components are averaged. Similarly, the yellow and blue pixels of the second line are converted to YCbCr, and the Cb and Cr components are averaged. After YCbCr conversion, sampling, and conversion back to RGB, the pattern 500 appears as shown in FIG. 5, with the exploded 2 by 2 section 600 shown in FIG. 6. After all of the conversions have been completed, the RGB values in FIG. 6 are, from top left to bottom right, (110, 17, 110) 602, (145, 18, 145) 604, (237, 237, 237) 606 and (18, 18, 18) 608. While FIG. 3 and FIG. 4 look very similar to one another when viewed by the naked eye, the mathematical differences are easily perceived when viewed up close (particularly if viewed in color). More information regarding conversions is described below.

According to exemplary embodiments, a flow of data from an application running on PC 202 using, for example a Windows XP operating system, to a custom HDMI mixer 204 to a display on TV 112 will now be described with respect to the flow diagram shown in FIG. 7. An application 702 resides in PC 202. This application renders its contents into an alpha RGB (ARGB) texture, e.g., a 32 bpp ARGP texture shown at 704. The ARGP texture is then transferred to a graphics card 306 which can also reside in the PC 202. The pixel shader 708 draws the received ARGP texture data to a screen associated with PC 202. The pixel shader 708 performs color conversion and calculations as part of its rendering operation. The data is then forwarded, typically as the two 24-bit sequences 710, to be mixed with the remaining screen contents in block 712. The output of this mixing as shown by block 714 is another set of two 24-bit sequences where some pixels are in a standard RGB format and some pixels can be in the custom formats described herein. This data then under goes gamma correction in step 716 prior to being transmitted to the mixer device 204 via a video output in step 718.

According to exemplary embodiments, once the mixer device 204 receives the source input, checksum calculations are performed on every 24-bit sequence in step 720. A determination for whether the checksums match is performed in step 722. If the checksums match, then color and the alpha components are extracted in step 724 and put into the 4:4:4:4 YCbCrA format as shown in block 726. If the checksums do not match, then a color conversion assuming 100% opacity occurs in step 728 resulting in a 4:4:4:4 YCbCrA as shown in block 730. The pixel data is then recombined in step 732 and merged into a composite with a received second input in step 734. According to exemplary embodiments, this can allow for an overlay from the first data signal, e.g., from PC 202 via input 208, to be put on top off a video stream which was received as a second data signal, e.g., via input 210 or to create some type of a blended output signal. This single integrated composite signal is then transmitted over an interface, e.g., a HDMI interface, in step 736 to a TV (or other display) 112 for displaying on a screen in step 738.

Figure 7:
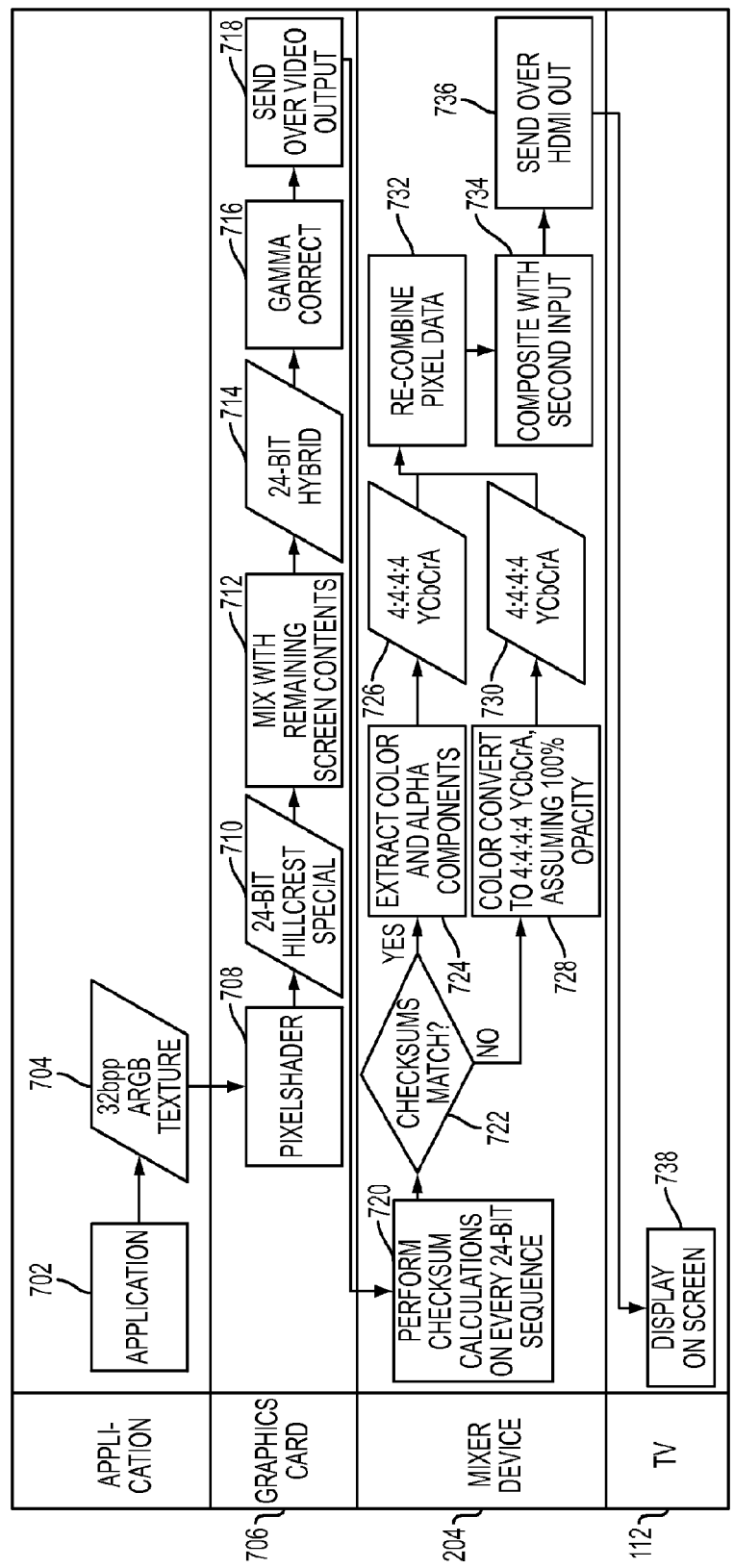
FIG. 7 is a flowchart illustrating the flow of data from an application to a televisions display according to an exemplary embodiment of the present invention.

Using the information provided above with respect to the exemplary flowchart of FIG. 7, more details associated with the colors, signals, formats and processing according to exemplary embodiments are now provided. As described above, a 48-bit sequence is used for the flow of data. RGB typically interprets each 24-bit sequence individually, however exemplary embodiments described herein treat the data in pairs, e.g., two 24-bit RGB pixel sequences. Instead of storing red, green and blue information, exemplary embodiments can perform a color conversion to generate the YCbCr data. The color conversion can be performed dynamically and the mixer device 204 can use the checksum value to determine how to interpret a given 48-bit sequence. The mixer 204 can receive instructions to turn this feature on or off based on a signal from the PC 202. Additionally, the mixer can receive information about the alignment of the CYA pixels which allows for a reduction of calculations involved as this will remove the need for the mixer 204 to check every possible byte pair.

Typically in computer graphics, color is stored using a linear scale which includes red, green, and blue channels. Assuming values range from 0 to 1.0, and color is ordered as red, green, blue, the vector (1.0, 0, 0) is pure red, while (0, 1.0, 0) and (0, 0, 1.0) are pure green and pure blue respectively. Furthermore, (1.0, 1.0, 1.0) is white and (0.5, 0.5, 0.5) is a shade gray. Since this is a linear scale, the value (0.5, 0.5, 0.5) is half as bright as (1.0, 1.0, 1.0). However, analog devices (like CRT monitors and TVs) do not respond in a linear way. For example, assuming a CRT receives a voltage to output, that ranges from 0 to 1.0, 0.5 is not half as bright as 1.0, instead it appears much darker. This function can be approximated as shown below in equation (1).

$$f(x) = x^\gamma \quad (1)$$

where $0 < x < 1$. Typically, CRTs have $\gamma=1.6$ or $\gamma=2.2$.

In order to have the colors look correct, they must be adjusted. This can be done by using equation (2) as shown below.

$$f(x) = x \wedge \left(\frac{1}{\gamma}\right). \quad (2)$$

However, color data typically gets stored as integer data, usually in the range of 0 to 255 (rather than 0 to 1) as an approximation. HDMI 1.3 supports 10 bpp, 12 bpp, and 16 bpp formats, extending this range to 0-1023, 0-4095, and 0-65536 respectively. How much is to be gained from these extended ranges remains to be seen however exemplary embodiments can support at least some portion of these additional ranges. Additionally, if a gamma correction is performed for DVI/HDMI output, there is some amount of data loss.

According to exemplary embodiments, a video card 706 in PC 202 can perform a gamma correction on the frame buffer data before the data is sent out over the DVI/HDMI link to the mixer 204. However, in some cases, the user of the PC 202 may have previously adjusted the gamma settings to support other applications. Since the gamma correction is typically performed in the video card hardware using a lookup table (LUT) to perform the conversion, exemplary embodiments allow for accessing and using the LUT to perform the desired gamma correction without altering other gamma settings for other applications. For example, in systems which use Windows XP, instructions can be provided which allow exemplary embodiments described herein to obtain the current gamma LUT from the video card 706, and enable the application 702 to generate a checksum based on what the video card 706 can output. This then provides a value for the checksum that will allow a predictable gamma correction. According to an alternative exemplary embodiment, for the case when the gamma table cannot be retrieved via normal system calls, it is typically possible to perform a calibration step that generates test patterns and communicate this information to the mixer 204 to determine how colors are converted. This alternate exemplary embodiment can come with a cost of a onetime penalty, e.g., time and resources, on software installation.

Gamma functions are generally non-linear but the input/output values used are fixed to 0-255. The presence of a gamma correction LUT can diminish the range of possible values. Since gamma functions are non-linear, the mapping would not be a 1 to 1 mapping which results in an unreliable reversion of the effects of gamma correction as well as complications with the use of checksum values. For example, assuming 24 bpp RGB, if the user has specified a uniform gamma correction of 2.2, there are approximately 180 unique values for each of the red, green, and blue channels (as opposed to 256). The checksum will be limited to this range. Therefore, assuming the bits add up to 280, this would have the value 100 (280 I 180=100). However, one cannot put the value 100 into the checksum byte since the gamma correction would essentially change this value to 167. Therefore, according to exemplary embodiments, in order to communicate the checksum, the PC 202 will generate a LUT that creates a 1 to 1 mapping between pre and post gamma corrected spaces.

According to exemplary embodiments, this desired 1 to 1 mapping can be obtained by creating and using two LUTs. The first LUT for this purpose is called a cyaToPreGamma which is computed and which maps checksum values into bit sequences fed into the gamma correction function. The second table for this mapping is called a postGammaToCya that maps gamma corrected values into normal integers. Taking the previously described example and using two LUTs, instead of using the value 100, the cyaToPreGamma table is consulted for the 100$^{th}$ unique value that will appear after the data is gamma corrected. In this purely illustrative example, 170 is the 100$^{th}$ unique value. Therefore, for this to appear in the output, the checksum is set to the bit pattern for 170.

According to exemplary embodiments, the application 702 on PC 202 can calculate multiple numbers of tables to aid in graphics rendering. This will generally occur upon startup. Regarding gamma correction, gamma correction values can be checked once upon startup or periodically during runtime at some frequency, e.g., once per second or once per minute. The determination of the checking can be influenced by information, if available and desirable, of user preferences for making gamma corrections to the graphics card 706 which is typically, but not always, infrequent. Additionally, the gamma LUT is relatively small with respect to memory storage requirements, for example a 3×256 matrix of 16-bit values, and therefore checking that the gamma LUT has been updated requires a memory comparison of two 1,536 byte blocks which is a trivial calculation for the PC 202.

According to exemplary embodiments, once the gamma LUT is retrieved, the application 702 determines the number of unique values that exist after gamma correction, which number of unique values is known as the "gamma corrected ordinal" herein. This gamma corrected ordinal is used because the pipeline for gamma correction is not a one to one mapping function. Color data is written as 8-bit integer values ranging from 0-255, while the gamma correction (f(x)=x^(1/γ)) operates with 0≤x≤1. The color values are converted into floating point (c/255), then gamma corrected, and then converted back into 8-bit integer values. For example, consider Table 2 which uses 3-bit integers for color data.

TABLE 2

| 3-bit Linear RGB | 0 | 1 | 2 | 3 | 4 | 5 | 6 | 7 |
|---|---|---|---|---|---|---|---|---|
| 3-bit Gamma Corrected (γ = 2.5) | 0 | 3 | 4 | 5 | 6 | 6 | 7 | 7 |

In this example shown in Table 2, the gamma corrected ordinal is six, since there are six distinct values.

As shown in Table 2, the process does not allow for only writing the checksum value out to the front buffer, allowing the hardware to perform a gamma correction and then retrieving the pre-gamma corrected value by the mixer 204. For example, using Table 2, if the checksum is four, the gamma corrected value is six, however the six (representing the gamma corrected value) could also have meant that the checksum input was a four or a five. According to exemplary embodiments, this problem can be solved by having the application 702 generate another table which maps the checksum value to a usable input. This is achieved by using the gamma correction ordinal and another lookup table called the cyaToPreGamma LUT. The application 702 generates a table that maps from [0-gamma correction ordinal]→[0-255]. Using the 3-bit example, the mapping would appear as shown in Table 3 below.

TABLE 3

| | Checksum value | | | | | |
|---|---|---|---|---|---|---|
| | 0 | 1 | 2 | 3 | 4 | 5 |
| Value to write | 0 | 1 | 2 | 3 | 4 | 6 |
| Gamma correct value | 0 | 3 | 4 | 5 | 6 | 7 |

Additionally, as shown in Table 3, the checksum values range from 0 to 5, but exemplary embodiments allow for the values to have a write skip.

According to exemplary embodiments, another table is created by the application 702 for the mixer device 204. This table, known herein as the postGammaToCya table is shown below as Table 4 and is used to undo the gamma correction for the CYA pixels. This postGammaToCya table maps corrected gamma values [0-255] to the range [0-gamma correction ordinal]. Continuing with the 3-bit example, an exemplary postGammaToCya table is shown below as Table 4.

TABLE 4

| | Gamma correct value | | | | | | | |
|---|---|---|---|---|---|---|---|---|
| | 0 | 1 | 2 | 3 | 4 | 5 | 6 | 7 |
| Checksum value | 0 | −1 | −1 | 1 | 2 | 3 | 4 | 5 |

While shown in Table 4, the −1 checksum value would not be expected to be used, since the mixer 204 should not receive input values, in this example, of 1 and 2. These values are shown here purely for completeness in this purely illustrative example. Additionally, according to exemplary embodiments, the gamma correction ordinal, the checksum constant and the postGammaToCya table are sent to the mixer device 204.

According to exemplary embodiments, the application 702 performs rendering on data. This exemplary rendering process tends to be different from a traditional rendering process in that anything that needs to preserve alpha data is rendered to an off-screen buffer that supports an alpha channel. This can be performed by, for example, using Direct3D9.

According to exemplary embodiments, once the image is rendered, the application 702 draws the contents to the screen using a custom pixel shader. The pixel shader first converts the 24-bit RGB data into floating point RGB. Next the color data is gamma corrected according to the system's gamma correction table. The resulting data is then converted into fixed point YCbCr. As described above for the checksum values, it is generally desirable to undo the gamma correction the hardware will apply. This can be accomplished by treating the YCbCr data in the way the checksum is treated and using the cyaToPreGamma LUT to write the final data. The alpha value is written in the same fashion.

When converting from 24-bit RGB to the 16-bit CYA format, adjacent pixels will be sampled and averaged to obtain the Cb, Cr and alpha values. Dither may be incorporated to reduce artifacts due to the conversion. The checksum is calculated by gamma correcting the YCbCr and alpha values, combining them together and taking the modules of the result using the gamma correction ordinal. Noise can also be of concern during this process. For example, two black pixels side by side may get interpreted as being of the CYA format when they are instead of the RGB format. Therefore, according to exemplary embodiments, another value, e.g., some amount of random data, may be added to the checksum in order to minimize the potential for false positives. Additionally, by calculating the checksum of the gamma corrected values, the mixer 204 can perform fewer operations on the incoming data.

According to exemplary embodiments, the mixer 204's hardware will include memory to store the gamma correction ordinal and the postGammaToCya LUT. The mixer 204 will also maintain an LUT for checksum noise. When the mixer 204 receives a video frame from the PC 202, the mixer 204 will attempt to interpret the incoming data as CYA pixels only when the pixel would lie inside one of the specified window regions. For each 24-bit pair, the mixer will calculate the checksum in the same manner in which the PC 202 performs its checks, and check it against the received checksum. If the checksums match, then the mixer 204 will treat the data as CYA pixels. For any pixels that fail the checksum test, those pixels are treated as RGB pixels with 100% opacity. Additionally, the mixer 204 can overlay the PC data on top of whichever other data is present, e.g., a received HDMI video signal.

According to exemplary embodiments, the checksum is calculated using the pixel data as well as the location on screen. The PC 202 can determine the screen coordinates of every pixel it draws using the window position information, as well as data while rendering. Since the mixer 204 has the full contents of the data to draw, it also has the screen position of every pixel. However, rather than use the x, y coordinates directly (which generates horizontal, vertical or diagonal lines) another LUT is utilized. According to exemplary embodiments, this LUT is the dither LUT which is a 512 element array of random 8-bit values generated on the PC 202. Using multiple tables on a single system could create some undesirable issues, therefore a single table is typically created when the PC 202 starts up, and sent to the mixer device 204.

As described above, noise can exist in the system which can produce some clumping of pixels or a visible line which indicates misinterpreted pixels. According to exemplary embodiments, as described above, adding some pseudo random data for each checksum can minimize this clumping. This pseudo random data is coordinated between the mixer device 204 and the PC 202, but needs only to be done at system startup. By introducing the random values, instead of having clumps of pixels that would interpreted incorrectly, the false positives were spread randomly across the images which it is expected will create visual errors which will be almost imperceptible when viewed from a distance.

According to exemplary embodiments, an array of random values can be used, along with the x and y screen coordinates, to add some randomness to the checksum. In preliminary testing, the noise array gave satisfactory results, even when relatively small, e.g., 128 bytes. Because of the constraints of some video cards 706, according to an exemplary embodiment, the noise array should remain smaller than 256 bytes. However, in other exemplary embodiments, if the mixer hardware is able to support dynamic sizes, then larger noise array sizes, based on the characteristics of the video card 706 and/or user settings, may be used. In one case it was seen that patterns could be observed when only 64 values were used, but the false positives were still distributed evenly across the screen, rather than clumped together. When sampling the noise array, the x value can be divided by two, and both the x and y values should be clamped to [0-sizeOfNoiseArray]. Additionally, assuming multiple windows may be displayed using the CYA format, any window drawn using the CYA format should be aligned to an even pixel. This is achieved, for example, via processing Window Messages, and snapping to grid lines as needed.

According to exemplary embodiments, the checksum is calculated on the PC 202 side as shown by equation (3) below:

$$\text{checksum}=\text{SpecialToPreGamma}[(Y1'+Cb'+Cr'+Y2'+\text{Alpha}'+\text{noise}[x]+\text{noise}[y])\% \text{ gammaOrdinal}] \quad (3)$$

Y1', Cb', Cr', Y2', and alpha' are all computed by the following conversions:
32 bpp integer RGBA [0,256] to floating point RGBA [0,1.0], To gammaCorrected RGBA [0, 1.0], To YCbCrA [0,1.0], To 32 bpp integer YCbCrA [0-gamma ordinal] and To gamma corrected 32 bpp integer Y'Cb'Cr'A' [0-256] —(Note that this correction is not technically gamma corrected, but a pre-gamma correction step that is run through the lookup table the video card 706 will use to perform gamma correction on the bits).

According to exemplary embodiments, as described above, the mixer 204 retrieves byte sequences as 24 bpp RGB data. The mixer 204 will evaluate pairs as 6 byte sequence as denoted by b0, b1, b2, b3, b4, and b5. The mixer 204 can calculate the checksum as shown in equation (4) below.

$$\text{checksum}=\text{postGammaToSpecial}[b0+b1+b2+b3+b4+\text{noise}[x]+\text{noise}[y]\% \text{ gammaOrdinal}] \quad (4)$$

If checksum equals b5, the mixer will treat these two bytes as a CYA pixel. Y1=postGammaToCya[b0], Cb=postGammaToCya[b1], Cr=postGammaToCya[b2], Y2=postGammaToCya[b3] and Alpha=postGammaToCya[b4]. Once the mixer 204 has reverted the gamma correction performed by the video card 706, it is free to use the YCbCr data as desired. The mixer 204 may either convert it to RGB following the equations as shown below or use the YCbCr data directly if it has supporting hardware.

According to exemplary embodiments, RGB data can be encoded to YCbCr using the following equations:

$$Y=R*0.2126+G*0.7152+B*0.0722 \quad (5)$$

$$Cb=0.5*(B-Y)/(1-0.0722) \quad (6)$$

$$Cr=0.5*(R-Y)/(1-Kr) \quad (7)$$

With R, G, and B range from 0 to 1.0. Y is clamped to the range from 0 to 1.0. Cb and Cr are in the range −0.5 to 0.5. Conversion back to RGB is performed using the following equations:

$$B = Y + 2*Cb(1 - 0.0722) \quad (8)$$

$$R = Y + 2*Cr(1 - 0.2126) \quad (9)$$

$$G = \frac{Y - R*0.2126 - B*0.0722}{0.7152} \quad (10)$$

The constants used correspond to those found in the BT. 709 specification.

Figure 8:
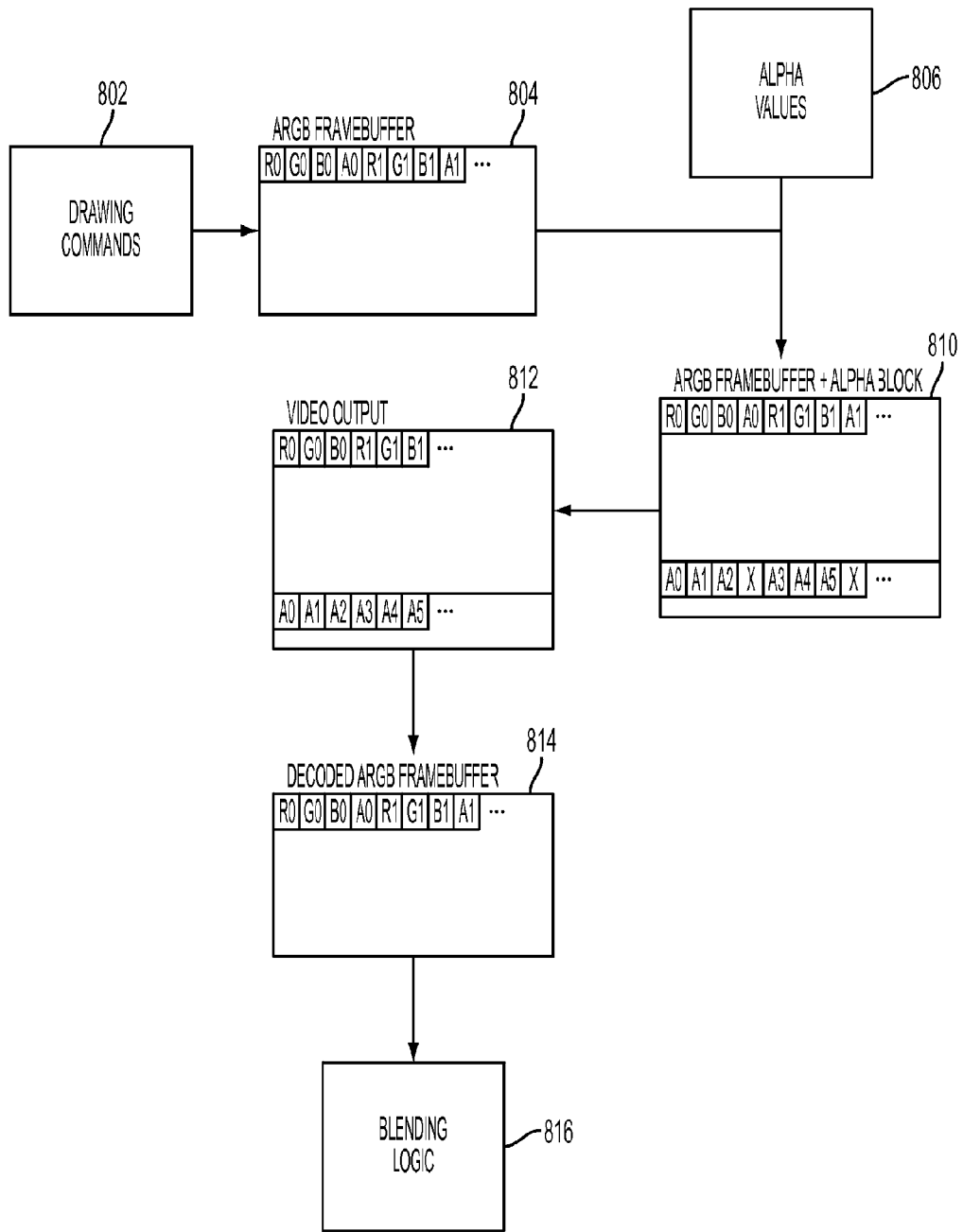
FIG. 8 shows a flowchart illustrating a flow of data for encoding a full screen according to an exemplary embodiment of the present invention.

According to another exemplary embodiment, it may be desirable to instead encode the full screen. Although this may require additional software complexity for some operating systems, one way to proceed with full screen encoding where more control over the STB platform is available and is shown in FIG. 8. Initially, drawing commands 802 are entered into an ARGB Framebuffer 804 with a size of w×h×32 bpp. Alpha values 806 are then gathered and combined with the ARGB Framebuffer 804 resulting in an ARGB Framebuffer plus Alpha Block 810 which has a size as shown below in equation (11).

$$\text{size}=w \times h \times 32 \text{ bpp}+\frac{1}{3}w*h*32 \text{ bpp} \quad (11)$$

The video is then output from the PC 202 in the form shown in block 812 to the mixer 204 which receives this video and re-integrates the alpha component(s) as shown by the decoded ARGB Framebuffer 814. The decoded ARGB Framebuffer 814 has a size of w×h×32 bpp. This data is then sent to the blending logic 816 for more processing which can result in a display on a screen (possibly by using one or more of the exemplary functions described above with respect to FIG. 7 as needed).

According to other exemplary embodiments, in addition to 24-bit Standard RGB (sRGB) and YCbCr, HDMI 1.3 supports 30-bit, 36-bit, and 48-bit xvYCC, sRGB, YCbCr while versions prior to HDMI 1.3 only support 24-bit sRGB and YCbCr. For ease of description, exemplary embodiments described herein have 24-bit RGB as the format sent from the PC 202 to the mixer device 204. The mixer 204 can be configured to only accept only 24-bit RGB data, thus ensuring that the video card 706 will not perform a conversion of the data. However, alternative exemplary embodiments can use higher bit depth RGB formats as they are more widely used using similar processing techniques and equations in support of the processing techniques with changes occurring to some of the values as the quantity of bits changes. The increased range of values should result in a decrease of false positives on the mixer side, and an increase in the picture quality of anything rendered with an alpha channel.

According to one alternative exemplary embodiment the PC 202 could draw all data as 24-bit RGB, dedicating 6-bits to each of red, green and blue values. Implementing this approach would require fully controlling the drawing system on the PC 202 and require sufficient computing support, e.g., a Linux host via an Open Graphics Library fragment shader with a custom Window manager.

According to another alternative exemplary embodiment the PC 202 may be controlled in such a way as to draw standard RGB color data to only a portion of the screen, while embedding an alpha mask in separate region. This would allow for the full 24-bit RGB data and 8 bits of alpha. For example, the PC 202 could send frame buffer data that is 1280×1024, but only use the upper region from (0,0) to (1280×767) for color data. The bottom portion of the screen (0,768) to (1279×1023) is used as alpha mask. Each 24-bit value contains three 8-bit alpha values corresponding pixels in the top half of the display. One approach would be to compress the y axis, since the upper portion of the screen has a height of 768, while the lower half has a height of 256. Since 256 is a multiple of 768, e.g., 256*3=768, recombining the estranged values is trivial. Implementing this approach would require sufficient computing support, e.g., a Linux host via an Open Graphics Library fragment shader with a custom Window manager.

Figure 9:
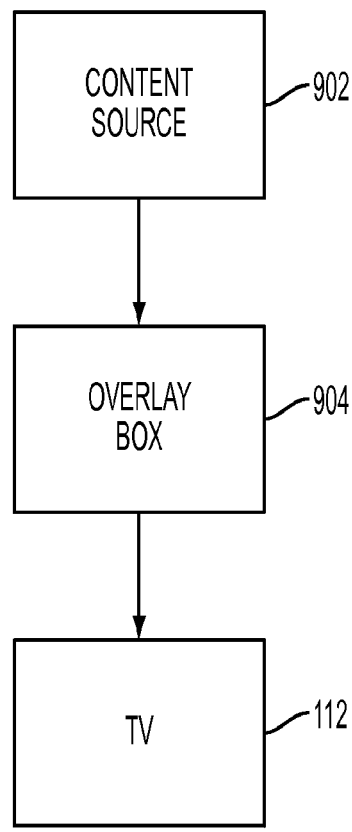
FIG. 9 depicts data flow between exemplary hardware for providing an overlay over a video feed according to exemplary embodiments of the present invention.

According to other exemplary embodiments, overlaid graphics can be provided directly on top of typical TV programs, video on demand, or the like, either under the control of the end user, e.g., the viewer of the TV program as it is being displayed/output via his or her television, or under the control of a $3^{rd}$ party (e.g., an advertiser) or both. This can be accomplished by, according to exemplary embodiments as shown in FIG. 9, providing an overlay box 904 between a content source (or numerous content sources) 902 and the television 112. The overlay box 904 receives the raw or native video and/or audio feed from the content source 902 and overlays graphics on top of the raw or native video and/or audio feed to provide a composite output on the television 112. Some examples of features which can be delivered to the end user using this technology will first be shown and described with respect to FIG. 10. Note that, although this exemplary embodiment depicts the overlay box 904 as separate unit, e.g., having its own housing, printed circuit board, power connection, etc., that according to other exemplary embodiments, the overlay box can be integrated into, e.g., either the content source (e.g., STB) or the TV. According to an alternative exemplary embodiment, the overlay box 904 can be a plurality of separate units, e.g., the PC 202 and the mixer 204 together can perform the function of the overlay box 904.

Figure 10:
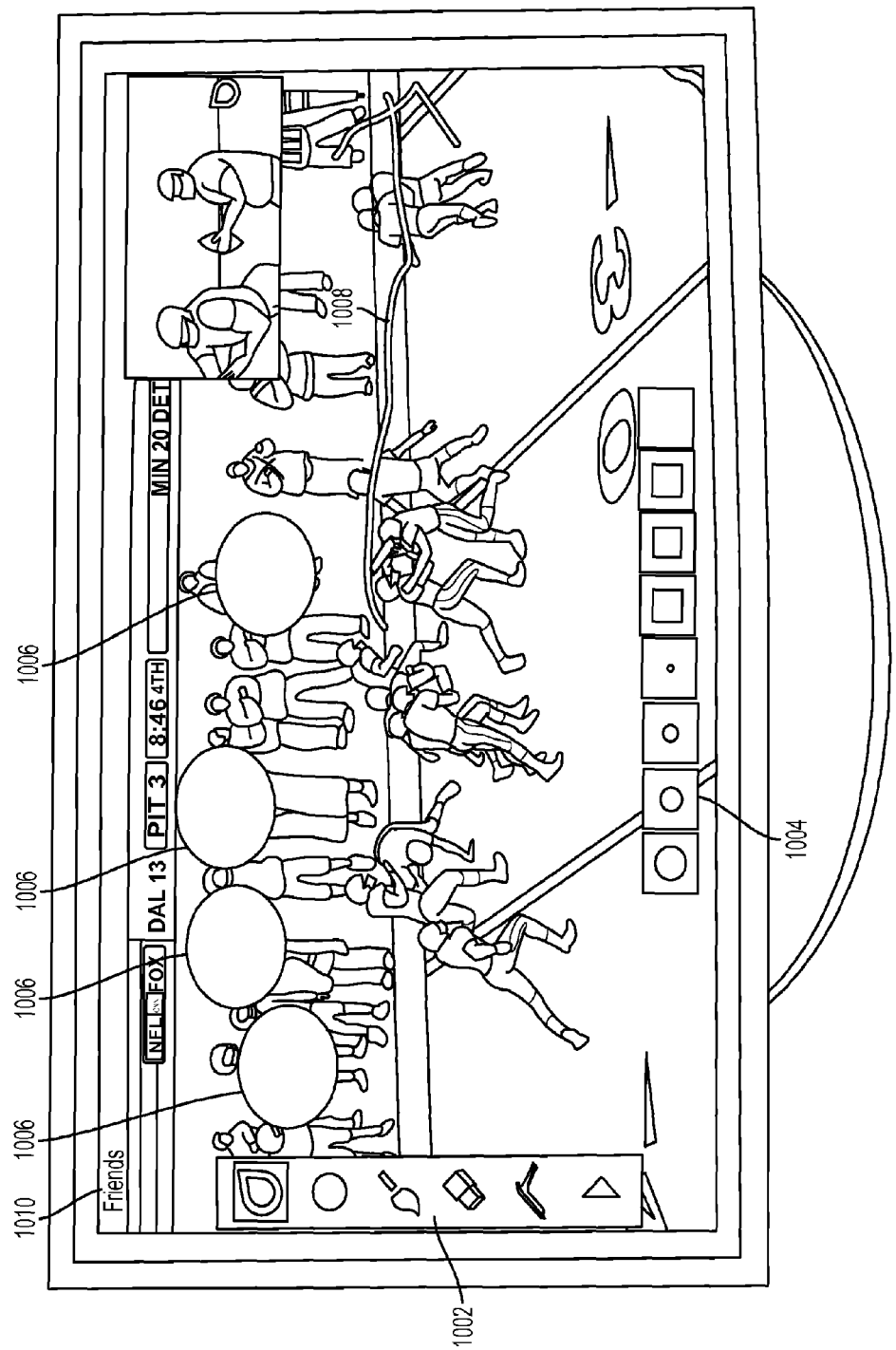
FIG. 10 shows an overlay over video on a display according to exemplary embodiments of the present invention.

According to exemplary embodiments, as shown in FIG. 10, overlaid graphics can be generated on top of video content under the control of the end user. For example, overlaid controls (shown in this purely illustrative example as a row of boxes or blocks 1002 and 1004 along both the left hand side of the TV screen and the bottom of the TV screen) can be automatically generated by the overlay box 904. A user can point to one or more of these controls, e.g., using a 3D pointer or a 2D mouse, click while the cursor is positioned over one of these controls and then "paint" or "telestrate" graphics on top of the live or paused video feed. In this example, the user has painted a number of tomatoes 1006 onto the screen and drawn an arrow 1008 on top of the football video feed.

Note that another interesting feature of some exemplary embodiments, although not required, is that graphics which are overlaid on one television, e.g., under the control of the end user, can be captured, conveyed and rendered on to the TV screen of another user. To this end, FIG. 10 also shows a list of "Friends" 1010 in the upper left hand of the screen, which friends can be interacted with using controls and architectures described below. For more information regarding overlays, the interested reader is directed to the U.S. Provisional Patent Application Ser. No. 61/292,684, filed on Jan. 29, 2010, entitled "Overlay Device, System and Method", the contents of which are included herein by reference.

Figure 11:
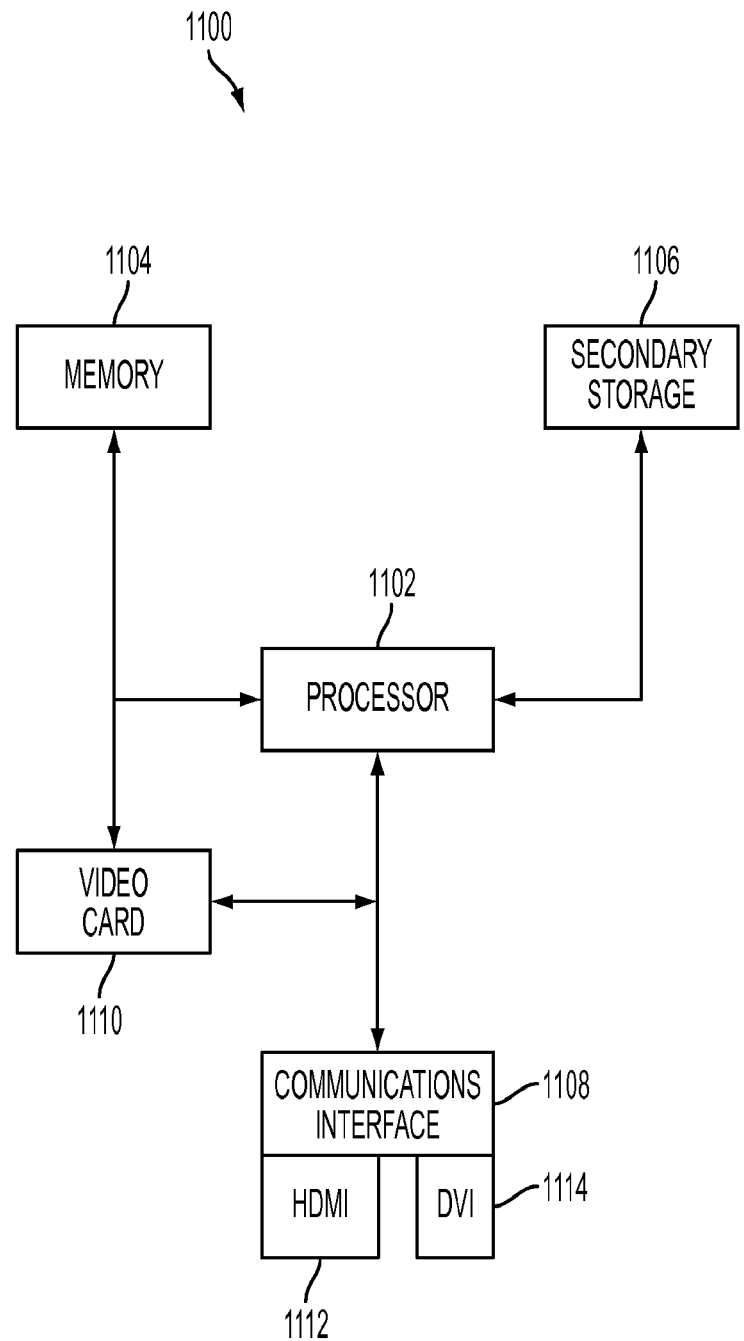
FIG. 11 depicts a device which can perform the functions of a personal computer and a mixer according to exemplary embodiments of the present invention.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. For example, the exemplary embodiments described above provide for mixing two (or more) HDMI/DVI signals and provide a coherent output image over HDMI while preserving the alpha channel over the HDMI/DVI link. An exemplary device 1100 which can be used, for example, to act as PC 202 or mixer 204, will now be described with respect to FIG. 11. The device 1100 can contain a processor 1102 (or multiple processor cores), memory 1104, one or more secondary storage devices 1106, an optional video card 1110 and an interface unit 1108 which can include an HDMI interface(s) 1112 and a DVI interface(s) 1114 to facilitate communications between the device 1100 and the rest of the media system 100. Conversion instructions, LUTs and associated instructions can be stored in either the memory 1104 or a secondary storage device 1106. Using stored information processor 1102 can create the LUTs and perform the video integration as described in the exemplary embodiments above. Thus, device 1100 can include the necessary hardware and software to perform as the PC 202 and/or mixer device 204.

Figure 12:
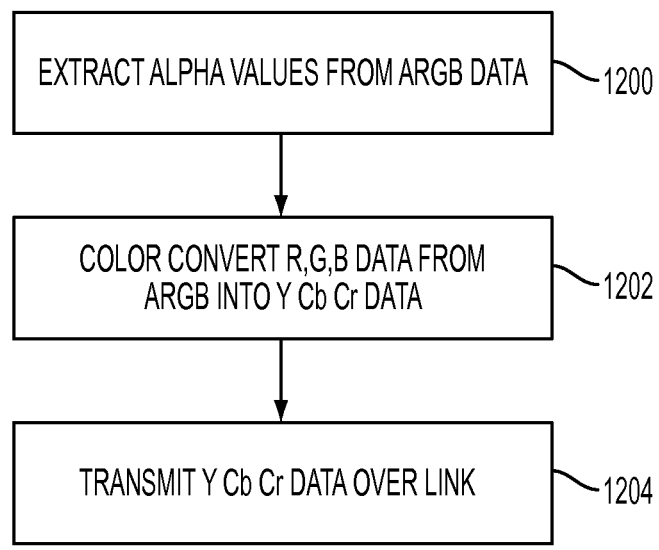
FIG. 12 is a flowchart illustrating a method for transmitting alpha red green blue (ARGB) data over a link which employs color fields for RGB data according to exemplary embodiments of the present invention.

Utilizing the above-described exemplary systems according to exemplary embodiments, a method for transmitting alpha red green blue (ARGB) data over a link which employs color fields for RGB data is shown in the flowchart of FIG. 12. Initially, alpha values are extracted from the ARGB data at step 1200. Then, the red, blue and green data from the ARGB data is color converted into YCbCr data at step 1202. The YCbCr data and the extracted alpha values can then be transmitted over the link at step 1204.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

The invention claimed is:

1. A device for embedding alpha red green blue (ARGB) data in an RGB stream comprising:
   a memory for storing instructions and one or more lookup tables;
   a processor for executing an application, wherein said application renders data into an ARGB texture;
   a graphics card which draws said ARGB texture on a screen and then processes said ARGB texture;
   a first video output interface for transmitting said processed ARGB texture; and
   a mixer device, wherein said mixer device comprises:
   two or more interfaces for receiving said processed ARGB texture and at least one other video signal;
   a processor for executing instructions for processing said received processed ARGB textures such that said received processed ARGB texture is combined with said at least one other video signal resulting in a composite signal; and
   a second video output for transmitting said composite signal,
   wherein said one or more lookup tables includes a first look up table for said graphic card's gamma correction, a second lookup table for mapping between pre and post gamma corrected spaces, a third lookup table for mapping corrected gamma values into integer values and a fourth lookup table for allowing said mixer device to undo a gamma correction when processing said processed ARGB texture.

2. The device of claim 1, wherein said video card includes a pixel shader which performs color conversion and calculations resulting in rendered data which is forwarded as two 24-bit sequences to a mixing block for mixing other screen data in said graphics card.

3. The device of claim 2, wherein said video card performs gamma correction on an output from said mixing block.

4. The device of claim 1, wherein said processing said received processed ARGB textures includes performing a checksum calculation on each received 24-bit sequence and if said checksums match said mixer device extracts color and alpha components from said each received 24-bit sequence prior to recombining pixel data, and if said checksums do not match said mixer device performs a color conversion assuming 100% opacity of the alpha components prior to recombining pixel data.

5. The device of claim 1, wherein said ARGB texture describes a full screen.

6. The device of claim 1, wherein said second video output is a high definition multimedia interface (HDMI) output.

7. A method for embedding alpha red green blue (ARGB) data in an RGB stream comprising:
   storing instructions and one or more lookup tables;
   executing an application, wherein said application renders data into an ARGB texture;
   drawing said ARGB texture on a screen;
   processing said ARGB texture;
   transmitting said processed ARGB texture;
   receiving, by two or more interfaces, said processed ARGB texture and at least one other video signal;
   executing instructions for processing said received ARGB texture such that said processed ARGB texture is combined with said at least one other video signal resulting in a composite signal;
   and transmitting said composite signal,
   wherein said one or more lookup tables includes a first look up table for said graphic card's gamma correction, a second lookup table for mapping between pre and post gamma corrected spaces, a third lookup table for mapping corrected gamma values into integer values and a fourth lookup table for allowing said mixer device to undo a gamma correction when processing said processed ARGB texture.

8. The method of claim 7, wherein a pixel shader performs color conversion and calculations resulting in rendered data which is forwarded as two 24-bit sequences to a mixing block for mixing other screen data.

9. The method of claim 8, further comprising:
   performing gamma correction on an output from said mixing block.

10. The method of claim 7, wherein said processing said received processed ARGB textures includes performing a checksum calculation on each received 24-bit sequence and if said checksums match said mixer device extracts color and alpha components from said each received 24-bit sequence prior to recombining pixel data, and if said checksums do not match said mixer device performs a color conversion assuming 100% opacity of the alpha components prior to recombining pixel data.

11. The method of claim 7, wherein said ARGB texture describes a full screen.

12. The method of claim 7, wherein said second video output is a high definition multimedia interface (HDMI) output.

13. A non-transitory computer-readable medium containing program instructions stored thereon which, when executed on a processor or computer, perform a method for transmitting alpha red green blue (ARGB) data over a link which employs color fields for RGB data, the method comprising:
   extracting alpha values from said ARGB data;
   color converting red, blue and green data from said ARGB data into YCbCr data;
   transmitting said YCbCr data with said extracted alpha values over said link;
   sub-sampling said YCbCr data after said color converting to reduce a number of bits associated with said YCbCr data; and
   appending a checksum to said subsampled YCbCr data and said extracted alpha values.

14. The non-transitory computer-readable medium of claim 13, wherein said link is a DVI link which has no standardized field with which to transmit said alpha values.

* * * * *